US007248854B2

(12) United States Patent
Schreyer et al.

(10) Patent No.: US 7,248,854 B2
(45) Date of Patent: Jul. 24, 2007

(54) METHOD FOR RADIO TRANSMISSION IN AN ALARM SIGNALING SYSTEM

(75) Inventors: Karlheinz Schreyer, Wolfratshausen (DE); Werner Schropp, München (DE)

(73) Assignee: Siemens Aktiengesellschaft, Munich (DE)

( * ) Notice: Subject to any disclaimer, the term of this patent is extended or adjusted under 35 U.S.C. 154(b) by 308 days.

(21) Appl. No.: 10/826,540

(22) Filed: Apr. 16, 2004

(65) Prior Publication Data

US 2004/0224713 A1 Nov. 11, 2004

(30) Foreign Application Priority Data

Apr. 16, 2003 (DE) ................................ 103 17 586

(51) Int. Cl.
*H04M 11/04* (2006.01)

(52) U.S. Cl. .................................... 455/404.1; 455/574

(58) Field of Classification Search ............. 455/404.1, 455/521, 70, 565, 574, 11.1, 414.4
See application file for complete search history.

(56) References Cited

U.S. PATENT DOCUMENTS

| | | | | |
|---|---|---|---|---|
| 5,455,569 | A * | 10/1995 | Sherman et al. | 340/825.02 |
| 5,737,318 | A * | 4/1998 | Melnik | 370/254 |
| 5,854,994 | A * | 12/1998 | Canada et al. | 702/56 |
| 5,907,491 | A * | 5/1999 | Canada et al. | 700/108 |
| 5,977,871 | A * | 11/1999 | Miller et al. | 340/506 |
| 6,208,247 | B1 * | 3/2001 | Agre et al. | 340/539.19 |
| 6,414,955 | B1 * | 7/2002 | Clare et al. | 370/390 |
| 6,563,910 | B2 * | 5/2003 | Menard et al. | 379/45 |
| 6,735,630 | B1 * | 5/2004 | Gelvin et al. | 709/224 |
| 6,894,975 | B1 * | 5/2005 | Partyka | 370/235 |
| 6,910,024 | B2 * | 6/2005 | Krishnamurthy et al. | 705/400 |
| 2003/0099221 | A1 * | 5/2003 | Rhee | 370/338 |
| 2003/0151513 | A1 * | 8/2003 | Herrmann et al. | 340/573.1 |

FOREIGN PATENT DOCUMENTS

| | | | |
|---|---|---|---|
| EP | 0 833 288 A2 | | 9/1997 |
| EP | 0 911 775 A2 | | 9/1998 |
| WO | WO 92/22883 | | 12/1992 |
| WO | WO0052658 | * | 9/2000 |

* cited by examiner

*Primary Examiner*—Duc M. Nguyen
*Assistant Examiner*—Chuck Huynh
(74) *Attorney, Agent, or Firm*—Baker Botts L.L.P.

(57) ABSTRACT

In a radio alarm signaling system with a central station (Z) and a plurality of bidirectional (BT1 to BT5) and unidirectional (UT1, UT2) subscribers, the unidirectional subscribers (UT1, UT2) attempt to send messages via one of the bidirectional subscribers (BT1 to BT5) to the central station. In this case the message sent by a unidirectional subscriber (UT2) is received by all bidirectional subscribers (BT1, BT2, BT5) in its radio coverage area. Each bidirectional subscriber that has received this message waits until a time slot individually assigned to it before forwarding the message. During the wait time each of these bidirectional subscribers (BT1, BT2, BT5) monitors the radio channel to see whether another subscriber has already forwarded the message. If this is the case it suppresses its own forwarding. This ensures that only one of the bidirectional subscribers (BT1) forwards the message so that no overloading of the radio system occurs.

7 Claims, 2 Drawing Sheets

METHOD FOR RADIO TRANSMISSION IN AN ALARM SIGNALING SYSTEM

PRIORITY

This application claims priority to German application no. 103 17 586.5 filed Apr. 16, 2003.

TECHNICAL FIELD OF THE INVENTION

The present invention relates to a method for radio transmission of messages in an alarm signaling system with a central station and a plurality of bidirectional and unidirectional subscribers, with the central switch and the bidirectional subscribers each featuring send and receive equipment while the unidirectional subscribers merely possess a send unit.

BACKGROUND OF THE INVENTION

Alarm signaling systems in which the messages are transmitted by radio provide the user with many advantages. The alarm signaling systems in this case comprise signaling sensors as subscribers or ancillary stations which, when a danger is detected, for example a fire or break-in, send an alarm message via a radio link to a central station (which should also be taken to mean repeaters) in which, to remedy the danger, further measures such as sending an alarm to the fire department or the police are initiated.

An alarm system is known from WO92/22883 in which battery-powered fire alarms and intrusion alarms transfer their relevant address, the measured data of the fire or intrusion alarm as well as data about the remaining energy of the batteries to a central station via a radio link. Such unidirectional systems are however only suitable for systems with low risks. To save energy the detectors are only equipped with a transmitter and only report at long intervals, for example every 24 hours, to the central station. They are not in a position to explicitly search for free radio channels in order to guarantee a transmission if radio channels are busy for example. Since the detectors cannot receive any acknowledgement error-free information transport cannot be ensured.

Compared to such unidirectional systems, the security of transmission can be significantly improved with bidirectional connections in radio fire alarm systems. However a receiver section increases the costs, the device itself is larger and consumes more power than just a transmitter. In EP 911 775 for example a fire alarm system is known which is bidirectional in design and in which the components are designed to save energy. Faults in such a system can be detected in less than 100 seconds; however what are known as fading holes can lead to unnecessary error messages. Additional mechanisms are necessary to resolve the problem.

From EP 833 288 a further method for radio transmission in a fire alarm system is known in which measurement data of a detector sensor is transmitted to a central unit via further detector sensors acting as intermediate stations if a direct radio connection to the central station does not exist because the radio range is too small or if there is a fault. A fixed hierarchical connection structure of the detection sensors is provided for this arrangement.

Despite the advantages of the bidirectional connections explained above there is still a requirement to also allow unidirectional subscribers in a system. Thus for example in intrusion alarm systems, with the portable transmitters for activating and deactivating the system, the receiver unit is dispensed with to save money and keep the devices as small as possible. In conventional systems unidirectional and bidirectional elements can also be operated together without any problems since all elements are only in contact with the central station. A sufficiently large amount of memory capacity can be provided here for the two different protocols. The situation is different in networked systems, such as in what are referred to as routing networks for example, in which, as explained above, adjacent subscribers act as intermediate stations. Since as a rule it cannot be predicted which of the bidirectional subscribers acting as a router will receive the unidirectional telegram, all bidirectional subscribers would have to know about all unidirectional subscribers. In such a system an avalanche of telegrams could be initiated by a unidirectional subscriber if for example many bidirectional stations receive one and the same unidirectional transmission and want to transport its message towards the central station. As well as imposing an undesired load on the radio channel significant priority conflicts arise where many messages are sent at the same time. Although specific protocol mechanisms are in a position to resolve such problems, they still cost time and they delay transmission. Long system reaction times however conflict with the objective of a delay-free response such as when activating or deactivating the system.

SUMMARY OF THE INVENTION

The object of the present invention is therefore to specify a method in a radio alarm signaling system which in the bidirectional network allows a unidirectional subscriber to use any bidirectional network subscriber as an intermediate station or router in each case, without an avalanche of telegrams being initiated via of the bidirectional subscribers which could lead to a system becoming overloaded.

Therefore, in accordance with the invention, if the unidirectional subscribers located outside the radio range of the target of their messages, which as a rule is the central station, attempt to send messages via one of the bidirectional subscribers to the central station, the following steps are executed:

- The message sent by a unidirectional subscriber is received by all bidirectional subscribers within its radio range,
- Each bidirectional subscriber which has received the message lets a wait time individually assigned to it elapse before sending a confirmation and/or a message to the central station,
- During the wait time each subscriber switches to receive in order to monitor the radio channel to see if other subscribers with a shorter wait time have already confirmed and/or forwarded the message to the central station, and
- As soon as a subscriber receives a confirmation of the message or the fact that has been forwarded, it suppresses its own confirmation or forwarding of the message.

The method in accordance with the invention thus ensures that, of all the bidirectional subscribers that have received the message, only a single subscriber, namely the one which is first in line according to its wait time, confirms or forwards the message. All the others receive this confirmation or forwarding message and then suppress their own forwarding. This keeps the load on the radio channel to a minimum. Since in each case only one bidirectional subscriber has a telegram to transmit, expensive electricity in all other subscribers is saved. Nor is any mechanism for resolving collisions triggered, therefore, the reaction time of the system remains short for example for the activation and deactivation mentioned above. Nor is any increased expense involved in the unidirectional element. It does not require additional input elements nor more memory space than a conventional transmitter.

Preferably the wait times of the individual subscribers can be defined in the system so that the central station confirms receipt as the first subscriber. This also reduces the reaction time of the system to a minimum. In addition the order of the time slots and thereby the wait times of all bidirectional subscribers can be defined by their address within the radio cell.

The forwarding of the message via a bidirectional subscriber is undertaken in an advantageous embodiment without checking the identification of the unidirectional subscriber. Only in the central station is a decision made as to whether to accept or reject the message from the subscriber. This means that the identifications of all unidirectional subscribers are only stored in the central station so that the individual bidirectional subscribers do not need any memory to store the identifications of the assigned unidirectional subscribers.

BRIEF DESCRIPTION OF THE DRAWINGS

The invention will be explained below in greater detail by exemplary embodiments on the basis of the drawing. The drawing shows FIG. 1 a block schematic of radio system with a central station and bidirectional as well as unidirectional subscribers, FIG. 2 a scheme showing at the timing of the process by which a unidirectional subscriber makes contact with a bidirectional subscriber and the forwarding of a message to the central station, and FIG. 3 a schematic diagram of the wait times before forwarding the individual subscribers in a radio system.

DETAILED DESCRIPTION OF THE PREFERRED EMBODIMENTS

Figure 1:
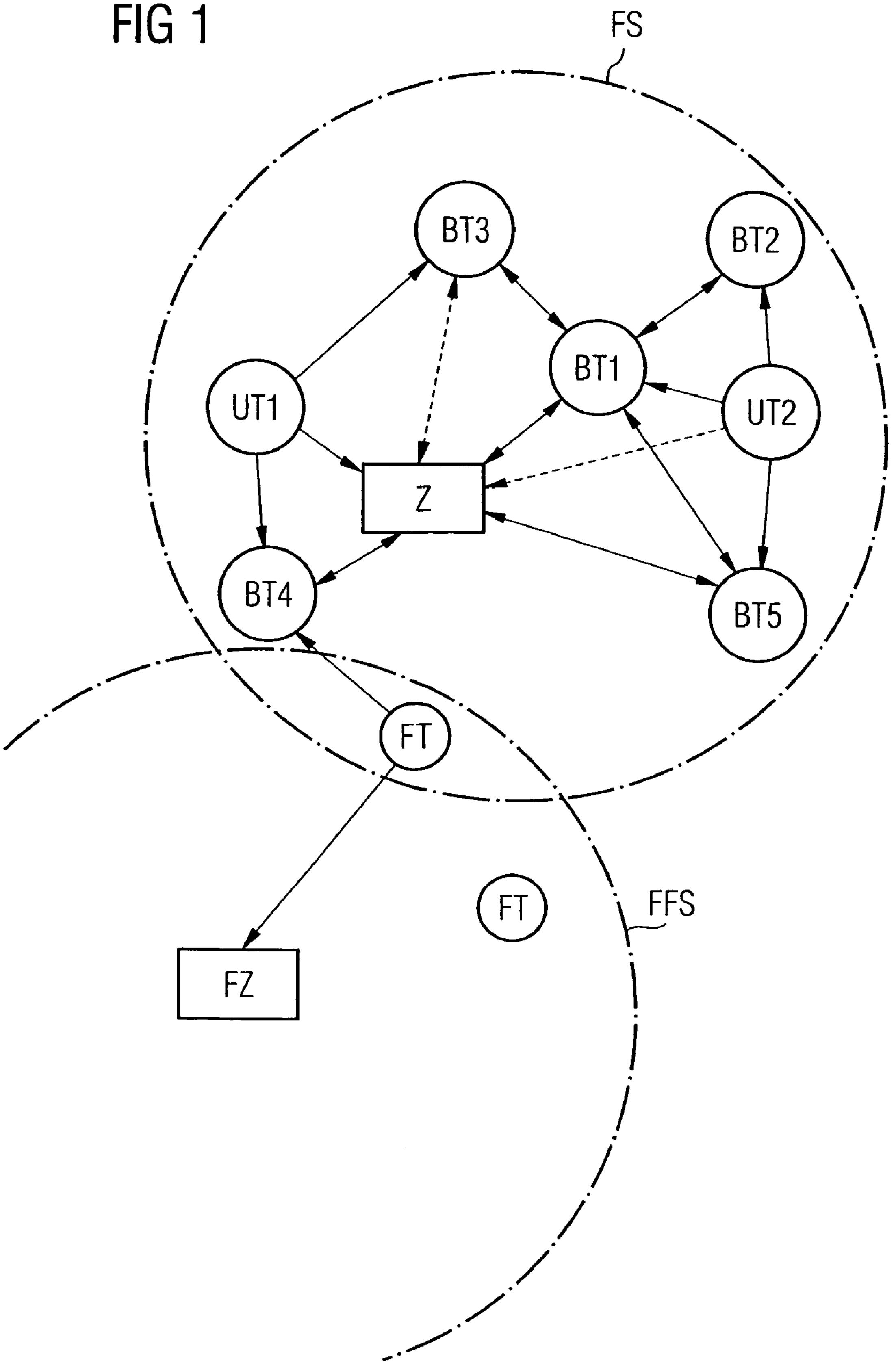
Figure 2A:
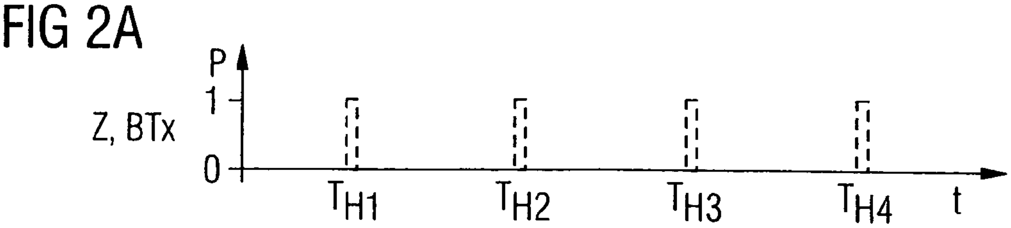
Figure 2B:
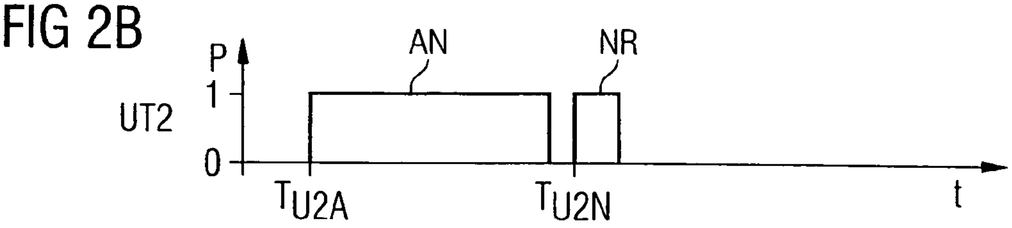
Figure 2C:
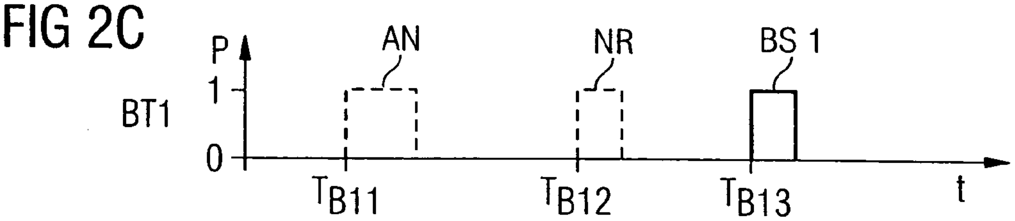
Figure 2D:
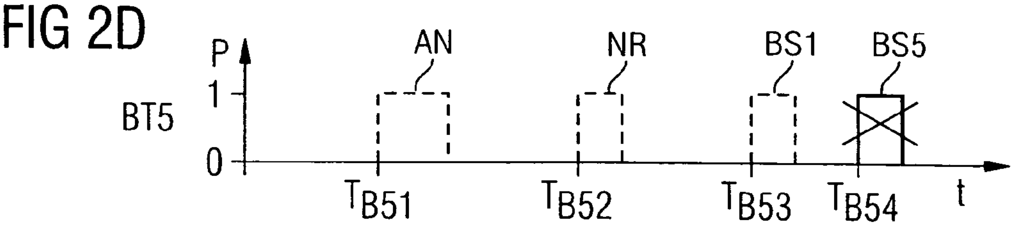

The radio system FS shown in FIG. 1 consists of a central station Z, a number of bidirectional subscribers BT1 to BT5 and individual unidirectional subscribers UT1 and UT2. Provided the radio coverage allows this, the individual bidirectional subscribers BT1, BT4 and BT5 can make direct contact with the central station, in some cases with each other as well. The drawing shows the possible direct radio connections as solid arrows whereas the connections which are not possible—because the radio range is too small or because of a fault—are shown as dotted arrows. Where this direct contact is not possible because of the range or because of a fault, such as for example between BT2 and BT3, contact will be established via a router, that is an intermediate station. In the example shown subscriber BT1 is such a router. The unidirectional subscribers UT1 and UT2 in the example only have a transmitter and can thus only issue messages. Provided they are in a radio range of the central station, like subscriber UT1, this message can be received directly by the central station which can then also identify the subscriber as a unidirectional subscriber. If a unidirectional subscriber is outside the radio range of the central station, like UT2, it needs a bidirectional subscriber, e.g. BT1, as a router or intermediate station.

In the vicinity of the radio system FS there are further foreign radio systems FFS each with a foreign central station FZ and foreign radio subscribers FT. The systems can overlap so that a foreign subscriber FT can lie within the radio coverage range of a subscriber BT4 of radio system FS. A message which reaches the subscriber BT4 is identified either there or on forwarding to the central station as coming from a foreign system and rejected or discarded in the central station Each radio system is identified by its own system identification In addition each subscriber of a radio system is provided with a subscriber number. Unidirectional subscribers are identified by their serial number. Each message is confirmed by the direct recipient or also by a number of recipients. If the subscriber which has received the message is not the final addressee of this message it forwards it.

Since the radio subscribers are generally stationary and supplied with battery power, for reasons of energy saving they cannot be permanently accessible. They thus listen at regular intervals to see if a subscriber wishes to send a message to them. If it does, they receive the message and confirm the receipt. A subscriber wishing to send something must indicate this by a header or announcement telegram AN. The duration of the announcement phase during which this announcement telegram is sent must in this case be longer than the listening intervals of the subscriber so that the announcement is securely received once for announcements with two attempts at receipt. The subscribers then evaluate the received announcement. If they are addressed, they prepare to receive the message, receive it and confirm the receipt. The announcement telegram contains items such as the send time of the message and the total length of the subsequent payload message as well as its own identification or serial number and the desired contact.

The timing sequence for sending a unidirectional message is shown in FIG. 2. Here FIGS. 2*a*) to 2*d*) respectively show a time axis with the times at which the relevant sender or recipient is switched off (power P=0) or is in operation (power P=1). Diagram a) shows how the central station Z or the individual bidirectional subscribers BTx switch on the receiver at specific intervals to listen to see if a message is directed to them. This occurs in each case at the points $T_{H1}$, $T_{H2}$ etc., in which case the receiver is only switched on for a short time in each case and is also switched off again if no message comes. The absolute position of $T_{H1}$ to $T_{Hn}$ is different in individual subscribers.

If a unidirectional subscriber UT2 in FIG. 1 now wants to send a message, it must first send an announcement telegram AN which it begins to do at point in time $T_{U2A}$. This telegram AN must be sent until such time as the bidirectional subscribers located in the radio coverage area have received it with certainty. In the example the subscribers BT1 and BT5 receive the announcement at point $T_{B11}$ or $T_{B51}$. (FIG. 2 uses a solid outline to show sent telegrams whereas received telegrams are shown with a dashed outline.)

After the announcement with the telegram AN the unidirectional subscriber UT2 now sends the actual message NR at the announced point in time $T_{U2N}$. This message is then received accordingly at points in time $T_{B12}$ and $T_{B52}$ in the bidirectional subscribers BT1 and BT5. Each of these two subscribers could now also forward this message to the central station Z.

Figure 3:
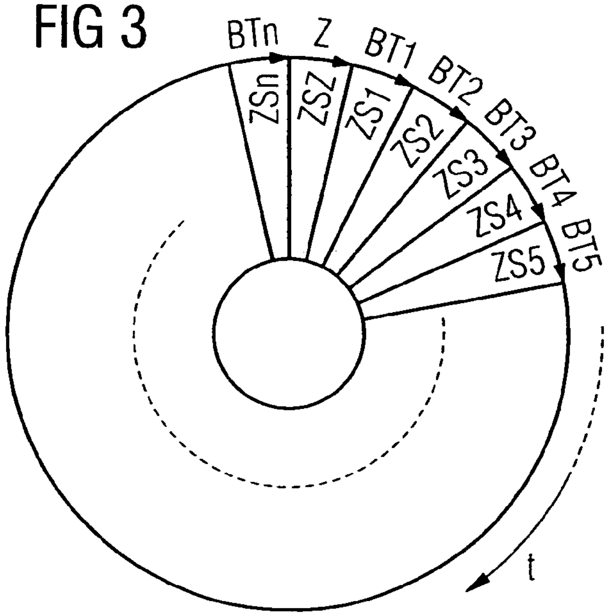

However in order to prevent an avalanche of radio messages in a system with very many subscribers it is defined that each bidirectional subscriber BT1 to BTn in the radio system has been given a very specific wait time ZS1 to ZSn. A scheme for the distribution of the time slots determined by the wait times is shown in FIG. 3. A first wait time ZSZ is assigned to central station Z, followed by the wait times ZS1 to ZSn for the bidirectional subscribers BT1, BT2, etc. to BTn.

After receiving the message NR the bidirectional subscribers BT1 and BT5 prepare the confirmation or forwarding of the message. As soon as the wait time ZS1 of subscriber BT1 has elapsed this subscriber issues the confirmation telegram BS1 which in its turn is received by all bidirectional subscribers in radio coverage area, i.e. also by the subscriber BT5 at point $T_{B53}$. This bidirectional subscriber BT5 would itself send a confirmation telegram BS5 after its wait time which elapses later ZS5, i.e. at point $T_{B54}$. After it has already received a confirmation telegram BS1 beforehand, it discards the received message and the prepared confirmation telegram BS5. All further bidirectional subscribers which have received the message from unidirectional subscriber UT2 behave in the same way. This means that only the confirmation telegram BS1 with the message of the unidirectional subscriber UT2 is sent out and received by the central station. The central station Z checks the serial number contained in the unidirectional message of the unidirectional subscriber and then decides whether to accept or discard the message.

We claim:

1. A method for radio transmission of messages in an alarm signaling system with a central station and a plurality of bidirectional and unidirectional subscribers, in which the central station and the bidirectional subscribers each feature a send and receive unit while the unidirectional subscribers merely possess a send unit and whereby the unidirectional subscribers located outside the radio coverage area of the destination of a message of the unidirectional subscriber, which as a rule is the central station, attempt to send messages via one of the bidirectional subscribers to the destination, comprising the steps of:

- assigning individual time slots to each bidirectional subscriber;
- receiving a message sent by a unidirectional subscriber by all bidirectional subscribers within its radio coverage area,
- waiting by each bidirectional subscriber that has received the message for said individually assigned timeslot to send a confirmation and/or to forward the message to a destination or to a central station;
- during a wait time, switching to receive by each bidirectional subscriber in order to monitor a radio channel to see if another bidirectional subscriber with a shorter wait time has already confirmed the message and/or forwarded it to the central station, and
- as soon as a subscriber receives a confirmation of the message or the fact that it has been forwarded, suppressing its own confirmation or forwarding of the message, wherein the order of the wait times and thereby the wait times of the bidirectional subscribers is defined by their address within the radio cell.

2. The method in accordance with claim 1, wherein, all bidirectional subscribers first wait to see if the central station has received and confirmed the message before they confirm or forward the message in their next available time slot.

3. The method in accordance with claim 1, wherein, in the central station the identification of the unidirectional subscriber is checked and in accordance with this check, the message is either accepted or rejected.

4. The method in accordance with claim 1, wherein, in the central station the identification of the unidirectional subscriber is checked and in accordance with this check, the message is either accepted or rejected.

5. A method for radio transmission of messages in an alarm signaling system with a central station and a plurality of bidirectional and unidirectional subscribers, comprising the steps of:

- assigning individual timeslots to each bidirectional subscriber;
- receiving a message sent by a unidirectional subscriber by all bidirectional subscribers within its radio coverage area,
- waiting for said individually assigned timeslot by each bidirectional subscriber that has received the message to send a confirmation and/or to forward the message to a destination or to the central station, wherein during a wait time, each bidirectional subscriber switches to a receive mode in order to monitor a radio channel,
- monitoring whether another bidirectional subscriber with a shorter wait time has already confirmed the message and/or forwarded it to the central station, and
- as soon as a bidirectional subscriber receives a confirmation of the message or the fact that it has been forwarded, suppressing its own confirmation or forwarding of the message, wherein the order of the wait times and thereby the wait times of the bidirectional subscribers is defined by their address within the radio cell.

6. The method in accordance with claim 5, wherein, in the central station the identification of the unidirectional subscriber is checked and in accordance with this check, the message is either accepted or rejected.

7. The method in accordance with claim 5, wherein, in the central station the identification of the unidirectional subscriber is checked and in accordance with this check, the message is either accepted or rejected.

* * * * *